(12) United States Patent
Drackett et al.

(10) Patent No.: US 7,941,181 B2
(45) Date of Patent: May 10, 2011

(54) METHOD AND APPARATUS FOR FACILITATING THE RENDERING OF HUMAN COMMUNICATION CONTENT

(75) Inventors: Christopher W. Drackett, Chicago, IL (US); Steven J. Nowlan, South Barrington, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 612 days.

(21) Appl. No.: 11/531,774

(22) Filed: Sep. 14, 2006

(65) Prior Publication Data

US 2008/0070625 A1 Mar. 20, 2008

(51) Int. Cl.
*H04M 1/00* (2006.01)
(52) U.S. Cl. ............. 455/556.2; 370/404; 370/352; 370/316; 370/535; 370/476; 370/400; 370/487; 709/236; 709/219
(58) Field of Classification Search ............ 370/401, 370/352, 316, 535, 476, 474, 487, 343, 503, 370/493, 538, 342, 338, 328, 406; 725/63; 709/236, 219, 231; 455/406
See application file for complete search history.

(56) References Cited

U.S. PATENT DOCUMENTS

| 6,151,634 | A * | 11/2000 | Glaser et al. | 709/236 |
| 6,609,097 | B2 * | 8/2003 | Costello et al. | 704/500 |
| 2002/0003815 | A1 * | 1/2002 | Hisamatsu et al. | 370/535 |
| 2003/0217362 | A1 * | 11/2003 | Summers et al. | 725/63 |
| 2004/0213273 | A1 * | 10/2004 | Ma | 370/401 |
| 2005/0089022 | A1 * | 4/2005 | Muhonen et al. | 370/352 |
| 2005/0152300 | A1 * | 7/2005 | Edsberg | 370/316 |
| 2006/0270467 | A1 * | 11/2006 | Song et al. | 455/570 |

* cited by examiner

*Primary Examiner* — Marivelisse Santiago-Cordero
*Assistant Examiner* — Joseph Arevalo

(57) ABSTRACT

A device (200) that is presently rendering human communications content (202) via a corresponding human communication interface (203) will also passively wirelessly transmit information (103) regarding an existing native capability regarding also wirelessly transmitting the human communication content. Upon receiving (in response to that passive transmission) information (105) regarding an existing other device's (205) capability of also rendering that human communication content, this device can then switch (106) present rendering of the human communication content from the first device to the second device.

20 Claims, 2 Drawing Sheets

METHOD AND APPARATUS FOR FACILITATING THE RENDERING OF HUMAN COMMUNICATION CONTENT

TECHNICAL FIELD

This invention relates generally to the rendering of human communication content and more particularly to rendering in conjunction with a device having wireless communications capability.

BACKGROUND

Various devices having a human communication interface are known in the art. Such interfaces often serve to facilitate the rendering of human communication content (which rendering comprises, for example, causing the human communication content to be discernable to a human via at least one human sense of perception). A representative (though not exhaustive) listing of such devices would include wireless audio and/or data communications devices, audio and/or video playback devices, and so forth.

It is increasingly common for a given end user of such device to use their devices while moving from one place to another. As but one illustrative example in this regard, a given user might begin listening to an mp3 player that is built into their cellular telephone while at their home. Such listening would continue when this user moves to their automobile and may then continue further as the user begins working at their office.

As the end user moves from place to place, they often come within proximity of other devices that also have a human communication interface that could potentially serve as a platform to render the human communication content being perceived by the end user at that time. In some cases, switching the rendering of the human communication content from the first device to a second device can comprise a desired event. For example, in some cases this may facilitate compliance with the law. As one illustration in this regard, it may be illegal to listen to listen to mp3 player using both-ear headphones notwithstanding that listening to that same player through the automobile's speakers is allowed. In other cases, such a switch may simply represent a beneficial event as where the second device comprises a superior playback platform for the end user's human communication content.

Unfortunately, at present, effecting such a switch typically requires considerable intervention, knowledge, and training on the part of the end user. For example, to effect a change as suggested above from an mp3 player to an automobile playback system, it might be necessary to employ a properly configured intermediary device such as a short-range frequency modulation transmitter. These and numerous other obstacles, in turn, tend to generally discourage such changes. As a result, switching present rendering from one device to another often remains simply an end user wish.

BRIEF DESCRIPTION OF THE DRAWINGS

The above needs are at least partially met through provision of the method and apparatus for facilitating the rendering of human communication content described in the following detailed description, particularly when studied in conjunction with the drawings, wherein.

Figure 1:
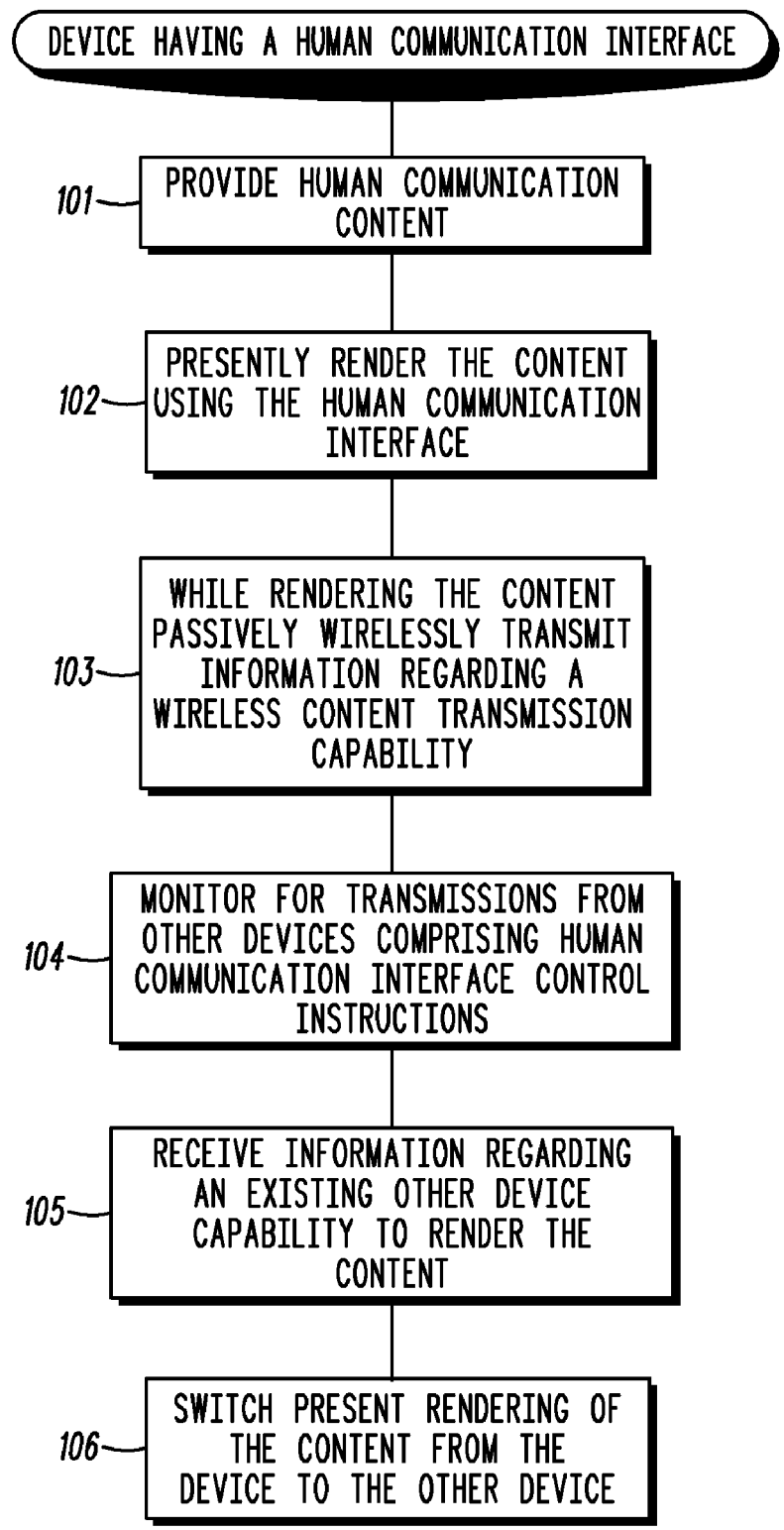
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a device that is presently rendering human communications content via a corresponding human communication interface will also passively wirelessly transmit information regarding an existing native capability regarding also wirelessly transmitting the human communication content. Upon receiving (in response to that passive transmission) information regarding an existing other device's capability of also rendering that human communication content, this device can then switch present rendering of the human communication content from the first device to the second device.

So configured, these teachings permit, for example, audio and/or video playback to be switched from a first platform to another when legal and/or end user preferences are thereby better met. The passive transmissions regarding this capability can be relatively fundamental or, if desired, can contain considerable additional information to aid in facilitating these teachings. This information can comprise, for example, metadata of various kinds regarding the human communication content, the device itself, and/or desirable rendering attributes of the second device as desired.

By one approach, if desired, these teachings will also accommodate monitoring for passive transmissions from other devices, which passive transmissions comprise, for example, human communication interface control instructions. Such instructions might pertain, for example, to volume settings, playback transport settings, display settings, media selection settings, formatting control information, and so forth. So configured, a given device can then better comport its own rendering activity with locally required and/or advised rendering stipulations. Such passive transmissions might be sourced, for example, by any of a variety of private, public, governmental, and/or commercial entities, to note but a few.

These and other benefits may become clearer upon making a thorough review and study of the following detailed description. Referring now to the drawings, and in particular to FIG. 1, an illustrative process 100 will be described. This process 100 may be effected, for example, by a device having a human communication interface. Various devices may serve in this regard including, but not limited to, two-way wireless audio communications devices, two-way wireless data communications devices, audio playback devices, video playback devices, audio/visual playback devices, computing platforms, and so forth. Similarly, these teachings are compatible for use with a wide variety of human communication interfaces including, but not limited to, displays, audio transducers, tactile input devices, pointing devices, audio input devices, and so forth.

This process 100 provides for the provision 101 of human communication content and the present rendering 102 of that human communication content using the aforementioned human communication interface. The human communication content itself can vary with the needs, requirements, and/or options as tend to characterize a given application setting. Illustrative examples would include, but are not limited to, audio content, video content, audio/visual content, user action events, user selection events, textual user input, auditory user input, gestural user input (including but not limited to hand movements, arm movements, whole or partial body movements, head movements, eye movements (including gaze directionality), and so forth), and the like. The rendering step can comprise, for example, causing the human communication content to be discernable to a human via at least one human sense of perception (such as the sense of vision, the sense of hearing, the sense of smell, the sense of touch, the sense of taste, and so forth).

While rendering this human communication content as described, this process 100 then provides for passively wirelessly transmitting 103 information regarding an existing first device capability regarding wirelessly transmitting the human communication content. This notion of passivity refers to the unilateral and non-compelling nature of the transmission contents; that is, this message is not intended or designed to force a response or an acknowledgement by a receiving device. So configured, a receiving device is free to observe, process, and/or ignore the transmission and its contents. In some embodiments, the notion of passivity may also include automatic initiation of the transmission (without human intervention in the form of a human input) for each message. In some embodiments, a state may be selected by a human input to either provide for automatic initiation of such transmissions, or to request some form of human input; for example, an alert could be given to a human operator that asks for an input to cause initiation of the transmission.

This passive wireless transmission can comprise a one-time event per rendering activity or can be provided on a more frequent basis. When providing multiple transmissions, the transmissions themselves can be irregularly offered or can be provided on a substantially periodic basis (for example, about every 0.5 seconds, every 5 seconds, every minutes, or the like). The transmission schedule can be unilaterally determined by the device itself or can match some external guideline or standard as desired.

The information in this transmission may comprise content that describes and/or characterizes device capabilities as correspond to the present rendering of the human communication content. Illustrative examples of such information would include, but are not limited to, metadata regarding the human communication content itself (such as, but not limited to, metadata regarding data formatting, vocoding, compression, encryption, file size, playback requirements, playback preferences, and so forth), metadata regarding the first device itself (such as, but not limited to, metadata regarding current power reserves, current rates of power consumption, available transmission modalities, available transmission capabilities, available outbound bandwidth, and so forth), and metadata regarding the receiving device (such as, but not limited to, metadata regarding desired minimum playback capabilities and so forth), to note but a few salient examples.

In general, this passively transmitted information can serve to inform a receiving device regarding a present capability of the device to forward a specific item of human communication content via another wireless transmission in order to facilitate a switch of playback platforms. Such information can be relatively minimal (by referring essentially only, for example, to the opportunity itself) or more richly endowed (by including additional information that the receiving device can use, for example, to assess the viability and/or advisability of making such a switch).

This process 100 then provides for receiving 105, in response to having passively wirelessly transmitted the aforementioned information, information regarding an existing other device capability to render the human communication content. This response could comprise a negative acknowledgement to indicate that a switch with respect to the rendering platform is not possible and/or not advisable. Such a response could also comprise, however, a positive acknowledgement.

A positive acknowledgement can assume any of a wide variety of forms. By one approach this step of receiving 105 information can be played out over numerous back-and-forth messages. By another approach the requisite information might be provided in a single message. In either case, the information can be conveyed using any protocol of choice including a proprietary protocol and/or an open standard as may be presently available or offered in the future.

It is possible, of course, that the responding device may comprise an inappropriate platform notwithstanding the existence of technological compatibility. For example, the device user may not with to burden devices that are not owned and controlled by the user. In such a case, the user may not wish to permit the rendering activity to be switched to a device that is owned and/or operated by another entity. To accommodate this concern, if desired, this step may further comprise determining whether the second device is authorized to render the human communication content.

By one approach, for example, each user may have a unique (or substantially unique) identifier associated with them. By this approach, each of the user's devices as correspond to these teachings can be configured to provide that identifier when appropriate. For example, this identifier may be included when providing the above-described passive transmission and/or when a device responds to that passive transmission. So configured, for example, the device could determine whether a responding device is authorized to render the human communication content, at least in part, by evaluating the user identifier as is included with that responsive communication.

When appropriate, this process 100 then provides for switching 106 present rendering of the human communication content from the present device to the responding device. By one approach this step can occur automatically. By another approach the user can be prompted to receive confirmation that such an action is authorized. If desired, the switch can occur without perceptible embellishment. By another approach, however, the switch can be accompanied by a preliminary, concurrent, and/or subsequent user-perceivable signal regarding the switch. This step can include, if desired, an assessment regarding the appropriateness of making such a switch. This assessment can be based upon whatever criteria may be important and/or relevant to a given application setting and can include, for example, basing such an action upon the contents of the aforementioned received information, other received information as may be relevant, and information possessed by the device itself, to note but a few illustrative examples in this regard.

If desired, these teachings will also optionally accommodate monitoring 104 for passive transmissions from other devices, which transmissions comprise human communication interface control instructions. These instructions can relate, for example, to volume settings, playback transport settings (as relate, for example, to a play mode of operation, a stop or pause mode of operation, a fast forward or fast reverse mode of operation, and so forth), display settings (as relate, for example, to color or monochromatic presentation, resolution, aspect ratio, contrast, brightness, and so forth), media selection settings (as relate, for example, to channel selections, track selections, shuffle/sequential play selections, subtitling selections, and so forth), and formatting control information (as relate, for example, to scrolling, panning, zooming, fading, balancing, and so forth), to note but a few illustrative examples.

By this approach, the content rendering as carried out by the device (either itself or via one or more surrogate rendering platforms as per the teachings set forth herein) can be informed, influenced, and/or controlled by externally sourced passive transmissions in this regard. So configured, for example, a present volume level for playback of audio content can be automatically lowered, if desired, upon entering a facility where such a practice is encouraged and/or required (presuming, of course, that this facility makes provision for the passive transmission noted above).

Figure 2:
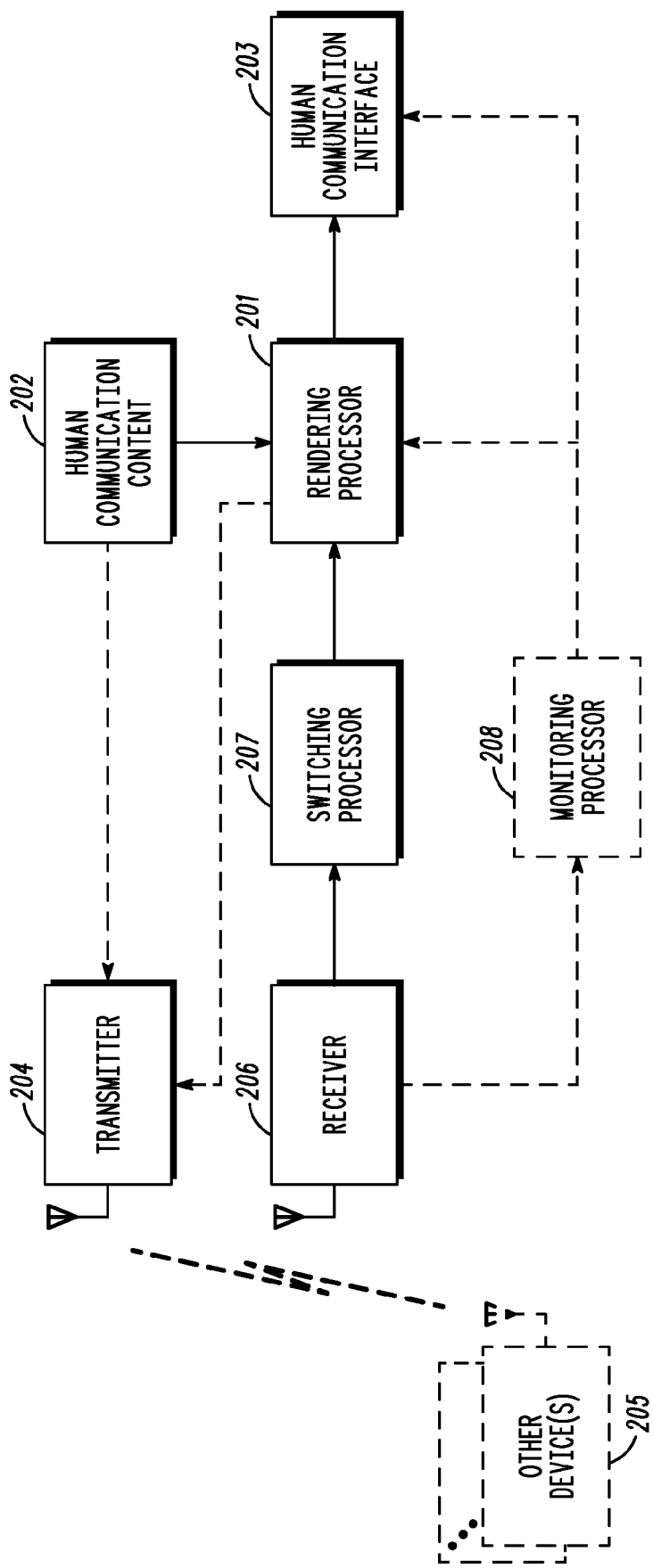
FIG. 2 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 2, an illustrative approach to such a platform will now be provided.

In this illustrative embodiment, the apparatus 200 may comprise a device as described or suggested above. This apparatus 200 may comprise a rendering processor 201 that uses human communication content 202 of choice and effects the rendering of that content 202 via an available human communication interface 203. Each of these various elements may be as described above if desired. This apparatus 200 also comprises a transmitter 204 that is configured and arranged to passively wirelessly transmit the aforementioned information regarding the capability of the apparatus 200 to effect wireless transmission of the human communication content.

This transmitter 204 may use any transmitter technology of choice with Bluetooth-based technology being one presently available logical choice in this regard. This transmitter 204 can be of sufficient design and power to achieve whatever effective coverage range may be judged useful in a given application setting. In general, however, this transmitter 204 will probably suffice as a relatively short-range platform. Again, Bluetooth-based technology will probably serve well in this regard.

This apparatus 200 may further comprise a receiver 206 (which may also comprise any receiver of choice including, but not limited to, a Bluetooth receiver) that is configured and arranged to receive information from another device (or devices) 205 regarding their existing capability to also render the human communication content as per these teachings. This receiver 206, in turn, may operably couple to a switching processor 207 that operably couples to the rendering processor 201 and that is configured and arranged to selectively switch present rendering of the human communication content 202 from the present apparatus 200 to one or more of the other devices 205.

So configured, these elements (and particularly the rendering processor 201 and the switching processor 207) can be configured and arranged (via, for example, appropriate programming as will be well understood by those skilled in the art) to comport with selected elements of the teachings set forth herein. This, in turn, will permit this apparatus 200 to determine when another device is available to effect present rendering of human communication content that is being presently rendered using native capabilities of the apparatus 200 itself and to effect selective switching of such rendering to the other device when and as appropriate.

This apparatus 200 may further optionally comprise, if desired, a monitoring processor 208 that operably couples to the receiver 206 and to the human communication interface 203 (and/or the rendering processor 201). This monitoring processor 208 can then be configured and arranged to facilitate the teachings set forth above regarding controlling the rendering process in response to received human communication interface control instructions as are received via the receiver 206.

Those skilled in the art will recognize and understand that such an apparatus 200 may be comprised of a plurality of physically distinct elements as is suggested by the illustration shown in FIG. 2. It is also possible, however, to view this illustration as comprising a logical view, in which case one or more of these elements can be enabled and realized via a shared platform. It will also be understood that such a shared platform may comprise a wholly or at least partially programmable platform as are known in the art.

So configured, any number of operational scenarios that benefit the user, the device, or both are readily accomplished. Rendering activity can be switched, or retained, based upon any criteria of interest including but not limited to user preferences, local venue preferences or requirements, legal stipulations, available rendering capabilities, linking channel conditions, and so forth. This, in turn, can significantly increase a user's satisfaction with respect to the rendered result. Those skilled in the art will recognize that this process can be realized in as transparent or non-transparent a mode as may be desired.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As one example in this regard, these teachings might be employed to facilitate switching only a portion of the present rendering activity. This approach might be used, for example, when a present device is rendering a stereo audio track using only a native monaural capability. In such a case, the present device might switch, for example, left channel information to another available monaural device while itself switching to present rendering of only the right channel information. By this approach, two monaural platforms would work in tandem to render audio content in stereophonic form.

We claim:

1. A method comprising:
at a first device having a human communication interface:
providing human communication content;
presently rendering the human communication content using the human communication interface;
while rendering the human communication content, passively wirelessly transmitting information regarding an existing first device capability regarding wirelessly transmitting the human communication content;
receiving, in response to passively wirelessly transmitting the information, information regarding an existing second device capability to render the human communication content;
switching present rendering of the human communication content from the first device to the second device.

2. The method of claim 1 wherein the first device comprises at least one of:
a two-way wireless audio communications device;
a two-way wireless data communications device;
an audio playback device;
a video playback device;
an audio/visual playback device;
a computing platform.

3. The method of claim 1 wherein the human communication interface comprises at least one of:
- a display;
- an audio transducer;
- a tactile input device;
- a pointing device;
- an audio input device.

4. The method of claim 1 wherein the human communication content comprises at least one of:
- audio content;
- video content;
- audio/visual content;
- at least one of user action and selection events;
- at least one of textual, auditory, and gestural user input.

5. The method of claim 1 wherein presently rendering the human communication content using the human communication interface comprises causing the human communication content to be discernable to a human via at least one human sense of perception.

6. The method of claim 1 wherein passively wirelessly transmitting information regarding an existing first device capability regarding wirelessly transmitting the human communication content comprises passively wirelessly transmitting the information on a substantially periodic basis.

7. The method of claim 1 wherein the information regarding an existing first device capability comprises, at least in part, at least one of:
- metadata regarding the human communication content;
- metadata regarding the first device;
- metadata regarding the second device.

8. The method of claim 1 further comprising:
- at the first device:
  - monitoring for passive transmissions from other devices comprising human communication interface control instructions.

9. The method of claim 8 wherein the human communication interface control instructions comprise, at least in part, at least one control instruction regarding:
- volume settings;
- playback transport settings;
- display settings;
- media selection settings;
- formatting control information.

10. The method of claim 1 wherein receiving information regarding an existing second device capability to render the human communication content further comprises determining whether the second device is authorized to render the human communication content.

11. An apparatus comprising:
- a human communication interface;
- human communication content;
- a rendering processor operably coupled to the human communication content and the human communication interface and being configured and arranged to provide the human communication content to the human communication interface to thereby facilitate human-discernable rendering of the human communication content;
- a transmitter configured and arranged to passively wirelessly transmit information, during the rendering of the human communication content, regarding an existing apparatus capability regarding wireless transmission of the human communication content;
- a receiver configured and arranged to receive information regarding an existing other device capability to also render the human communication content;
- a switching processor operably coupled to the receiver and the rendering processor to switch the rendering of the human communication content from the apparatus to the other device.

12. The apparatus of claim 11 wherein the apparatus comprises at least one of:
- a two-way wireless audio communications device;
- a two-way wireless data communications device;
- an audio playback device;
- a video playback device;
- an audio/visual playback device;
- a computing platform.

13. The apparatus of claim 11 wherein the human communication interface comprises at least one of:
- a display;
- an audio transducer;
- a tactile input device;
- a pointing device;
- an audio input device.

14. The apparatus of claim 11 wherein the human communication content comprises at least one of:
- audio content;
- video content;
- audio/visual content;
- at least one of user action and selection events;
- at least one of textual, auditory, and gestural user input.

15. The apparatus of claim 11 wherein facilitating human-discernable rendering of the human communication content comprises causing the human communication content to be discernable to a human via at least one human sense of perception.

16. The apparatus of claim 11 wherein the transmitter is further configured and arranged to passively wirelessly transmit the information on a substantially periodic basis.

17. The apparatus of claim 11 wherein the information regarding an existing apparatus capability comprises, at least in part, at least one of:
- metadata regarding the human communication content;
- metadata regarding the apparatus;
- metadata regarding the other device.

18. The apparatus of claim 11 further comprising:
- a monitoring processor that is operably coupled to the receiver and that is configured and arranged to monitor for passive transmissions from other devices comprising human communication interface control instructions.

19. The apparatus of claim 18 wherein the human communication interface control instructions comprise, at least in part, at least one control instruction regarding:
- volume settings;
- playback transport settings;
- display settings;
- media selection settings;
- formatting control information.

20. The apparatus of claim 18 wherein the monitoring processor is operably coupled to the human communication interface to thereby facilitate control of the human communication interface in response to the human communication interface control instructions.

* * * * *